United States Patent
Copeland

(10) Patent No.: US 9,426,069 B2
(45) Date of Patent: Aug. 23, 2016

(54) SYSTEM AND METHOD OF CROSS-CONNECTION TRAFFIC ROUTING

(71) Applicant: Verizon Patent and Licensing Inc., Arlington, VA (US)

(72) Inventor: William F. Copeland, Garland, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 312 days.

(21) Appl. No.: 14/040,333

(22) Filed: Sep. 27, 2013

(65) Prior Publication Data

US 2015/0092772 A1    Apr. 2, 2015

(51) Int. Cl.
*H04L 12/741* (2013.01)

(52) U.S. Cl.
CPC ............ *H04L 45/745* (2013.01); *H04L 45/54* (2013.01)

(58) Field of Classification Search
CPC ....... H04L 45/745; H04L 45/00; H04L 45/54; H04L 12/4641; H04L 12/4679
See application file for complete search history.

(56) References Cited

U.S. PATENT DOCUMENTS

| | | | | |
|---|---|---|---|---|
| 8,179,905 | B1* | 5/2012 | Napierala | H04L 12/4641 370/237 |
| 8,194,570 | B2* | 6/2012 | Mohamed | H04L 12/4679 370/254 |
| 2005/0188106 | A1* | 8/2005 | Pirbhai | H04L 45/54 709/238 |
| 2008/0049752 | A1* | 2/2008 | Grant | H04L 12/4641 370/392 |
| 2009/0097490 | A1* | 4/2009 | Sanderson | H04L 63/0272 370/395.53 |
| 2012/0151057 | A1* | 6/2012 | Paredes | H04L 12/4641 709/225 |
| 2012/0314618 | A1* | 12/2012 | Ben-Houidi | H04L 12/4641 370/254 |
| 2013/0201909 | A1* | 8/2013 | Bosch | H04W 40/36 370/328 |

OTHER PUBLICATIONS

Salcedo Parra et al., MPLS/VPN/BGP Networks Evaluation Techniques, IEEE Workshop on Engineering Applications, Bogota, Columbia, May 2-4, 2012, IEEE, 978-1-4673-0870-0/12.*
Srisuresh et al., IP Network Address Translator (NAT) Terminology and Considerations, IETF Network Working Group, Aug. 1999, RFC 2663.*
E. Rosen and Y. Rekhter, BGP/MPLS IP Virtual Private Networks (VPNs), Feb. 2006, The Internet Society, Network Working Group, RFC 4364.*

* cited by examiner

*Primary Examiner* — Chi H Pham
*Assistant Examiner* — Shailendra Kumar

(57) ABSTRACT

Methods and systems are disclosed for routing traffic between Virtual Routing and Forwarding (VRF) devices. In one aspect, a method for routing traffic includes receiving traffic from a routing device associated with a customer. A control portion of the traffic may include an imported route target. The method further includes, based on the route target in the control portion of the traffic, consulting a table to determine an exported route target and, based on the determined exported route target, determining a destination device and routing the traffic to that device. In some embodiments, routing and/or destination devices may be provisioned to the customer on an exclusive or non-exclusive basis. Systems and computer-readable media are also disclosed for implementing the above-described method.

16 Claims, 9 Drawing Sheets

SYSTEM AND METHOD OF CROSS-CONNECTION TRAFFIC ROUTING

TECHNICAL FIELD

The present disclosure generally relates to methods and systems for enabling multiple devices to access cloud-based information providers.

BACKGROUND

To enable devices to communicate with one another across a network (such as the Internet), each device has an address that other devices can use to address it. The current form of Internet addressing, known as IPv4, is limited to $2^{32}$, or 4,294,967,296, unique device addresses. Each device that is publicly accessible by other computers on the Internet is represented with an IP address. IPv4 sets the following format for each IP address: xxx.xxx.xxx.xxx. Each 'xxx' in this address format represents a number from 0-255. All of these IP addresses make up what is referred to as the "address space." However, large portions of this address space have already been allocated. Consequently, the number of available addresses will soon run out.

Solutions exist for allowing multiple devices to access the Internet without allocating unique, publicly addressable IP addresses to each device. For example, Network Address Translation (NAT) is used to allow a set of devices, each having a private IP address, access the Internet. Multiple devices organized into a network with a single point of entry NAT device, typically a firewall and/or router, are represented to the rest of the Internet as a single IP address that is associated with the NAT device. In this way, the NAT device acts as a "public face" of the networked devices that are said to be "behind" the entry device. Devices (such as computers, tablets, or the like) may access devices on the rest of the Internet through the NAT device. The NAT device receives a communication from such a device, including a destination IP address, a destination port, a source IP address, and a source port. The NAT device then assigns a new source port to the communication and keeps track of that new source port. Responses to that communication will reference that new source port, enabling the NAT device to determine which device to send the communication to. This enables routing of traffic between devices behind the NAT device and devices on the rest of the Internet.

However, because IP-based networks only allow $2^{16}$ different ports (i.e., 0-65535), the number of connections to devices behind a NAT device may be limited because each device may attempt to make multiple connections. For example, if 1000 devices in a network attempt to access 60 different web pages during a period of time, the number of available ports will be exhausted quickly because each outgoing communication may result in initiating an assignment of a new source port.

NAT is also limited in its ability to enable information providers, such as websites, Software as a Service (SaaS) providers, or the like, to communicate with devices behind a NAT device. For instance, it is difficult for information providers to communicate with devices behind a NAT device without the devices behind the NAT device initiating the communication. One solution is to expose a single device behind the NAT device to the rest of the Internet by forwarding all incoming traffic to that device. This is known as a "demilitarized zone" or "DMZ." Using a DMZ enables communication with that single device, but can create security concerns, because the exposed device may be attacked by outside entities (e.g., ping floods, hacking, denial-of-service, or the like). Using a DMZ also only allows information providers to communicate with only the exposed device, as opposed to enabling communication with multiple devices behind the NAT device.

SUMMARY

Disclosed embodiments include example methods and systems for enabling multiple information providers, such as cloud-based information providers, to connect to a virtual private network (VPN), to enable devices connected to the VPN to access the information providers. Some embodiments are configured to preserve the privacy of the devices connected to the VPN and to minimize the use of globally unique IP addresses.

The disclosed embodiments include a method for receiving traffic from a routing device. The routing device may be associated with one or more customers. And the traffic may be associated with an imported route target. In some embodiments, imported route targets are information representing a route for traffic between two devices at the edges of a network (such as the Internet). The traffic may comprise two portions or parts. A first, data portion, includes, for example, a datagram or packet, and a second, control portion, includes, for example, route target information. The method further includes consulting a table at a cross-connecting system and, using the route target, determining an exported route target for routing the received traffic. The cross-connecting system, in some embodiments, comprises storage containing instructions and at least one processor operable to execute the instructions, and is configured to receive traffic from Virtual Routing and Forwarding (VRF) devices. Based on the exported route target a destination device and routing the traffic to that device is determined.

Disclosed embodiments also include a system having a memory for storing instructions and at least one processor operable to execute the instructions. When executed, the instructions cause a processor to perform operations of the foregoing method.

Disclosed embodiments also include a system comprising at least one filtering device and at least one cross-connecting system. The at least one filtering device comprises storage containing instructions and at least one processor operable to execute the instructions. When executed, the instructions cause the processor(s) to perform operations including receiving traffic from a VPN device. The VPN device may be associated with at least one customer. The operations further include assigning traffic from that VPN device to a globally unique address pool and reformatting the traffic to appear as if it is from an address in that address pool. The operations further include forwarding the traffic to a routing device associated with the customer for sending to the at least one cross-connecting system. The cross-connecting system, in some embodiments, comprises storage containing instructions and at least one processor operable to execute the instructions. When executed, the instructions cause a processor to perform operations comprising receiving traffic from a routing device associated with a customer. The traffic may comprise two portions or parts. A first, data portion, includes, for example, a datagram or packet, and a second, control portion, includes, for example, route target information. The operations include consulting a table at a cross-connecting system and, using the route target, determining an exported route target for routing the received traffic. The cross-connecting system, in some embodiments, comprises storage containing instructions and at least one processor operable to execute the instructions, and is configured to receive traffic from Virtual Routing and Forwarding (VRF) devices. Based on the exported route target a destination device and routing the traffic to that device is determined.

DETAILED DESCRIPTION OF EMBODIMENTS

Reference will now be made in detail to example embodiments and the accompanying drawings. Wherever possible, the same reference numbers will be used throughout the drawings and disclosure to refer to the same or like parts.

Systems and methods disclosed herein enable communication between devices behind a NAT device and publicly addressable information providers. The disclosed embodiments enable, among other features, a high number of simultaneous communications between devices behind the NAT device and the publicly addressable information providers.

Figure 1:
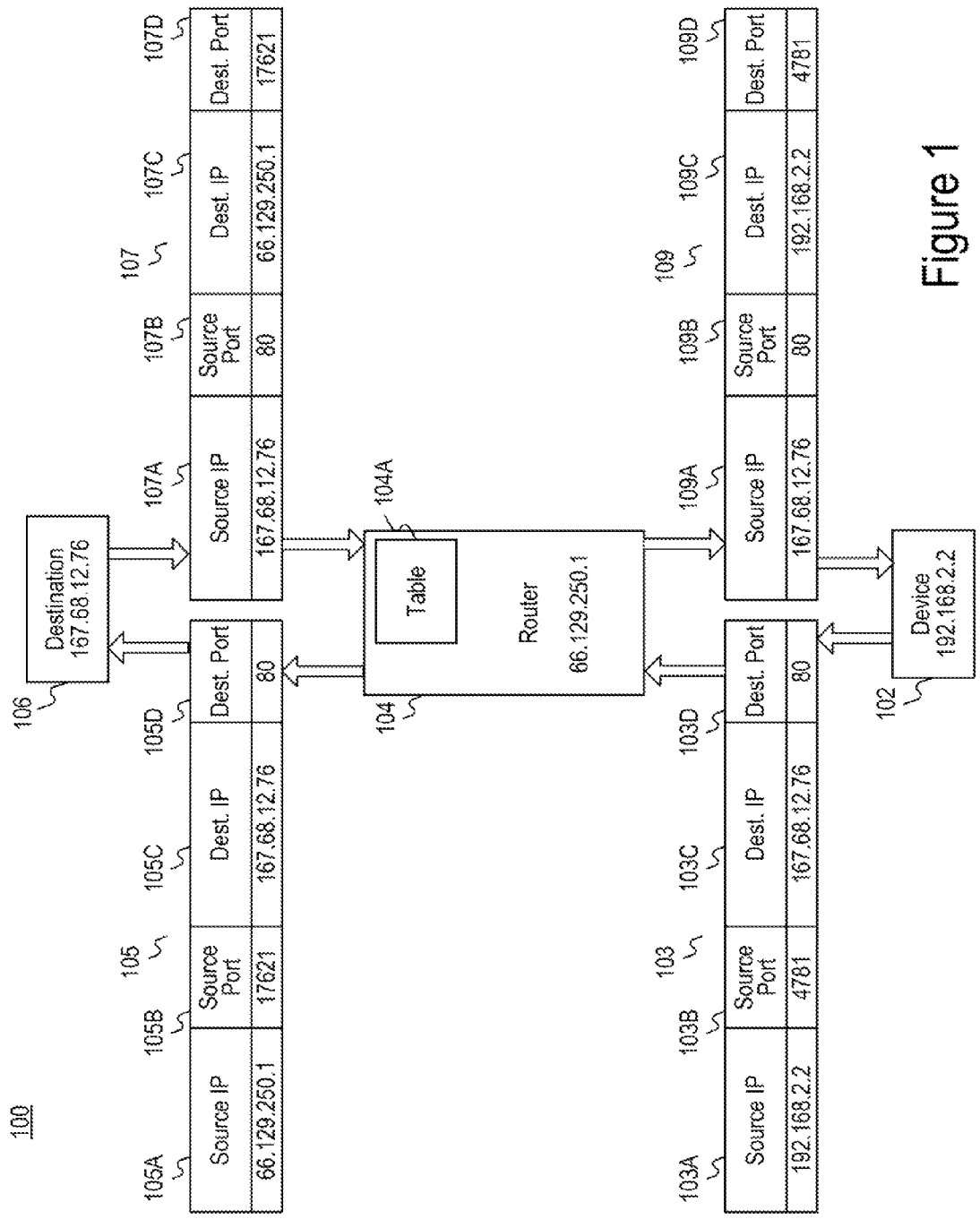
FIG. 1 is a diagram of example NAT traffic between devices using a NAT-enabled router.

FIG. 1 is a diagram 100 of exemplary NAT traffic. In this example a device 102 (such as a personal computer, tablet, smartphone, or the like) attempts to connect to a destination host 106 (such as a website or other information provider) through a router 104. Device 102, having a private IP address of 192.168.2.2 (e.g., an IP address that is both non-unique and not directly addressable from the Internet), attempts to initiate a connection to host 106, having a private IP address of 167.68.12.76 on port 80. For example, device 102 may request a web page from host 106 in response to a user selecting or clicking a link on a different web page. Device 102 sends a packet 103 to a router 104 and this packet reflects an attempt to connect to device 106 on port 80. In one example, packet 103 includes a source IP address 103A (192.168.2.2), an IP address that is not publicly addressable over the Internet; a source port 103B (4781) for receiving replies to packet 103; a destination IP address 103C (167.68.12.76), representing a publicly addressable IP address of destination host 106; and a destination port 103D (80), representing a port upon which device 102 wishes to send data to destination host 106.

Router 104 receives packet 103 and performs a process referred to as NAT translation. This process involves, for example, assigning a new port to an outgoing connection attempt from device 102, storing the new port with information from packet 103 (such as source IP address 103A, source port 103B, destination IP address 103C, and destination port 103D) in a table 104A, and modifying packet 103 to appear as though it is coming from router 104 instead of device 102.

A reformatted packet 105 contains source IP address 105A (66.129.250.1), which represents the publicly addressable IP address of router 104. Packet 105 also contains a source port 105B (17621). When destination host 106 returns its reply to device 102, it uses the information contained in reformatted packet 105 to send its reply. A packet 107 contains, as destination IP address 107C, the publicly addressable IP address of router 104 (66.129.250.1) received in packet 105 as source IP address 105A, and as a destination port 107D, the port assigned to the connection by router 104 (17621) received in packet 105 as source port 105B.

Router 104 then receives packet 107 and searches table 104A using source IP address 107A, source port 107B, destination IP address 107C, and destination port 107D. Also, if appropriate, router 104 reformats packet 107 for forwarding to device 102, by replacing destination IP address 107C and destination IP address 107D with the same information sent by device 102 in fields 103A and 103B. The resulting reformatted packet 109 is then sent to device 102.

Figure 2:
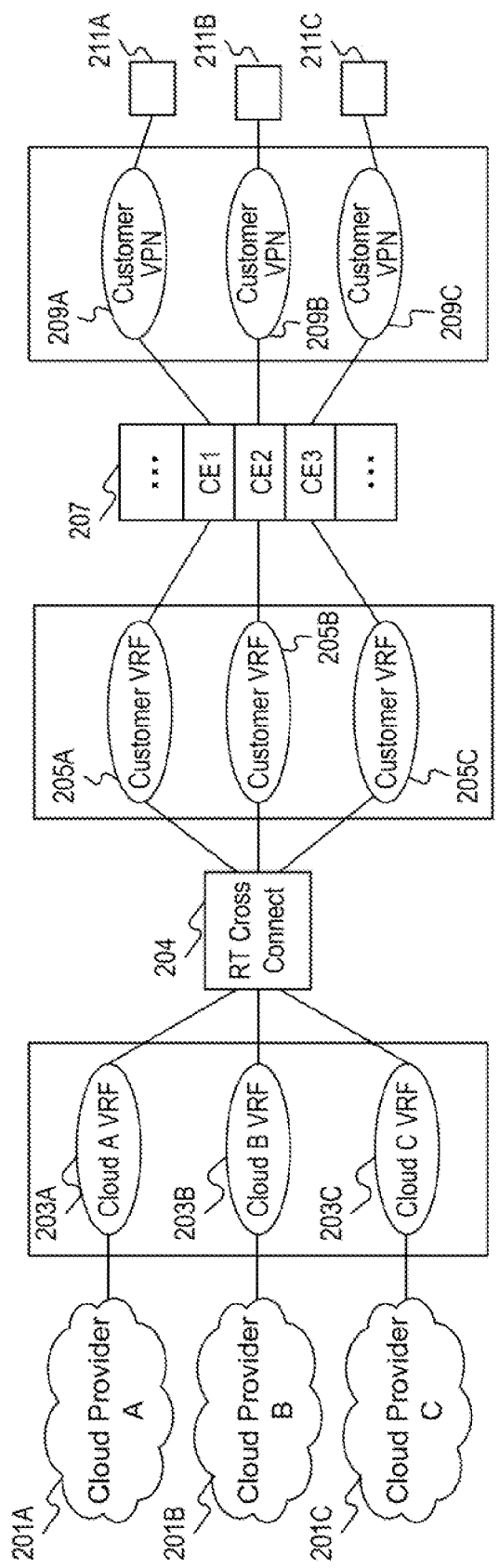
FIG. 2 is a diagram of devices for routing and forwarding traffic between devices on a network, consistent with disclosed embodiments.

FIG. 2 illustrates an example interconnection between cloud information providers 201A, 201B, 201C and customer networks 211A, 211B, and 211C. The quantity of each device shown in FIG. 2 is merely an example. Consistent with this disclosure any number of customer networks may connect to any number of information providers, using any number of intermediary devices. Each device may be implemented as one or more electronic devices, software code, hardware, firmware, or the like.

Customer network 211A comprises, for example, a network of devices, such as computers, smartphones, tablets, or the like. These devices, in some embodiments, have private IP addresses that are not directly addressable by computers on another network. For example, in some embodiments, devices on customer network 211A utilize a private IP address space (e.g., each device having an address of the form 10.0.0.x, where x is 0-255). In accordance with some embodiments, devices associated with another customer network, such as customer network 211B, also have IP addresses in the same space used by customer network 211A.

Using the intermediary devices in FIG. 2, multiple devices associated with customer network 211A are able to communicate with devices associated with cloud provider 201A, and vice versa. Additionally, RT Crossconnect 204 enables virtual routing between multiple customer networks. Thus, a device located at customer network 211A is able to access cloud providers 201A-201C by addressing traffic to an IP address inside of the same private IP address space allocated to that device. This enables, for example, bidirectional communication between devices associated with cloud providers 201A-201C and devices associated with customer networks 211A-211C, originating from either set of devices.

Each customer network may be associated with a respective customer VPN (Virtual Private Network) device, such as customer VPN 209A. Each customer network may also be associated with a respective customer VRF device, such as customer VRF device 205A. In some embodiments, customer VPN devices and VRF devices associated with a particular customer may be provisioned to the customer (e.g., availability/resources rented or leased to the customer) on an exclusive or non-exclusive basis.

In some embodiments, customers may also be provisioned a VRF device connected to a cloud provider. In embodiments where the customer is provisioned a VRF device connected to a particular cloud provider, the customer may also be provisioned resources or computer at the cloud provider.

Customer VPN devices 209A-209C may be implemented as one or more devices configured to send and receive traffic from devices at customer networks 211A-211C. Customer VPN devices 209A-209C enable the devices at customer networks 211A-211C to establish connections to a remote network, by establishing a VPN with that remote network. For example, customer VPN 209A may enable the devices in customer network 211A to connect to NAT facility 207 to establish connections. In some embodiments, the VPNs between a customer network and NAT facility 207 may implement a secure "tunnel" between the devices, such that a device on customer network 211A may communicate with other devices as if they were on the same network as the that device (e.g., communicating with NAT facility 207 or cloud provider 201A using an IP address in the same private IP address space as the device).

NAT facility 207 may be composed of Customer Edge (CE) devices (e.g., CE1, CE2, and CE3). These devices may interface with VRF devices to exchange information on routing between devices connected to NAT facility 207. For example, these devices may include customer VPN device 209A and customer VRF device 205A. The devices in 207 (e.g., CE1, CE2, CE3) may implement NAT processing (such as the NAT processing described above with respect to FIG. 1). In some embodiments, there may be a corresponding CE device for each customer VPN 209A-209C; each of the CE devices may be provisioned, on an exclusive or non-exclusive basis, to each customer. Provisioning includes, for example, leasing, renting, selling, or otherwise providing access to, a particular device or resources on a particular device. NAT facility 207 may be implemented as one or more devices, software, hardware, or the like.

NAT facility 207 may enable connections between customer VPNs 209A-209C and customer VRF devices 205A-205C. NAT facility 207 may implement firewalls or network security measures, such as zone policies, zone screens, interface policies, or the like. Zone policies include, for example, policies that permit or block particular services or protocols. For example, if NAT device 207 receives File Transfer Protocol (FTP) traffic and a zone policy does not allow FTP traffic, NAT device 207 may silently drop all FTP traffic. Zone screens include packet filtering to prevent network-based attacks. For example, NAT device 207 may implement zone screens that recognize particular traffic patterns, traffic thresholds/volume, Internet Control Message Protocol (ICMP) floods, SYN floods (e.g., a device sending "synchronize" packets requesting a connection from a remote host, in an attempt to overload the host's ability to respond to other connection requests), source-route attacks, or the like. If so, NAT device 207 may drop the traffic and/or generate an alert that particular traffic indicates a possible network-based attack. Interface policies include, for example, policies that permit or block particular traffic based on the source of that traffic. For example, if an interface policy on NAT device 207 blocks all FTP traffic coming from a particular interface, NAT device 207 may silently drop all FTP traffic coming from that interface but may not drop it when received from other interfaces. NAT device 207 may also assign traffic from a particular customer VPN device to a particular pool of IP addresses (e.g., a "NAT pool").

In some embodiments, customer VRF devices 205A-205C may be connected to NAT facility 207 and RT Crossconnect 204. Customer VRF devices 205A-205C may be implemented as one or more devices enables to receive traffic and mark the traffic with a particular route target. Marking the traffic, in some embodiments, involves modifying a control portion of incoming traffic. Network traffic may be composed of multiple layers as defined by the OSI (Open Systems Interconnect) Model. The OSI model includes seven layers—the Application Layer, the Presentation Layer, the Session Layer, the Transport Layer, the Network Layer, the Data Link Layer, and the Physical Layer. Marking traffic with a route target comprises inserting the route target in the Network Layer of the traffic; however, in other embodiments, route targets may be included in different layers as well.

In some embodiments, the particular route target may be based on a determination of the source of that traffic (e.g., the particular customer VPN device 209A-209C and/or CE device of NAT facility 207) and/or the destination of that traffic (e.g., one of cloud providers 201A-201C). Customer VRF devices 205A-205C may mark the control portion of the traffic by adding the route target to it. Customer VRF devices 205A-205C may also comprise a table for storing route target information. For example, customer VRF devices 205A-205C may store route target information corresponding to particular customers and routes provisioned to those customers in the table, and may consult that table in determining what route target to insert into the control portion of incoming traffic. Customer VRF devices 205A-205C may be provisioned to particular customers on an exclusive or non-exclusive basis.

RT Crossconnect device 204 routes traffic between customer VRF devices 205A-205C and cloud VRF devices 203A-203C. In some embodiments, this routing function may be accomplished by implementing a routing table capable of storing multiple routing instances. These instances represent routes between customer VRF devices 205A-205C and cloud VRF devices 203A-203C. RT Crossconnect device 204 uses route target information in the control portion of the traffic to determine which instance of the routing table should be consulted, and thus which of cloud VRF devices 203A-203C the information should be sent to. RT Crossconnect 204 may also remove route target information in received traffic (the "imported route target") and insert new route target information corresponding to a destination for that traffic (the "exported route target").

Cloud VRF devices 203A-203C route traffic between RT Crossconnect device 204 and cloud providers 201A-201C. When receiving traffic from cloud providers 201A-201C, cloud VRF device 203A-203C may mark traffic with route targets as needed before forwarding to RT Crossconnect device 204. Each of cloud VRF devices 203A-203C, when receiving traffic from RT Crossconnect device 204, determines a route target associated with the traffic. Based on the route target, cloud VRF devices 203A-203C may each determine a destination cloud provider and forward the traffic to the appropriate cloud provider 201A-201C. Each of cloud VRF devices 203A-203C removes the route target information associated with the traffic or otherwise omits it from traffic sent to cloud providers 201A-201C.

Cloud providers 201A-201C represent, in some embodiments, information providers such as virtual servers, private cloud computing/processing systems, Platform as a Service (PaaS) providers, CaaS (computing) providers, IaaS (infrastructure) providers, SaaS (software) providers, or the like. Cloud providers 201A-201C may operate infrastructure that enables devices on customer networks 211A-211C to perform calculations, run applications or websites, or the like. In some embodiments, cloud providers 201A-201C may be implemented as one or more computers for providing information, processing requests, or the like. One or more of those computers may be provisioned to a particular customer on an exclusive or non-exclusive basis. For example, if a customer wants to process large amounts of data, the customer can lease or buy resources at the cloud provider in the form of processor time, computing resources, or a computer. This enables security (because only one customer's data is stored on that computer) and speed for that customer (because that customer is not sharing resources with any other customers).

An example process for requesting and receiving information from cloud providers 201A involves a device at customer network 211A sending request traffic (e.g., one or more packets) requesting information from cloud provider 201A to customer VPN device 209A through customer network 211A. Customer VPN device 209A may reformat and forward the traffic to NAT facility 207. NAT facility 207 processes the traffic using zone policies, zone screens, or interface policies. NAT facility may also reassign a source IP address and source port listed in the traffic, to indicate an IP address from a NAT pool, and may forward the traffic to customer VRF device 205A. Customer VRF device 205A determines the source and destination of the traffic and assign a route target to a control portion of the traffic before forwarding the traffic to RT Crossconnect device 204.

RT Crossconnect device 204 receives the traffic and determines the route target embedded in the control portion, uses the route target and other information about the traffic to determine an exported route target corresponding to the destination referenced in the traffic, and reformats the control portion of the traffic to include that exported route target. RT Crossconnect device 204 then forwards the traffic to cloud VRF device 203A. Cloud VRF device 203A then forwards the traffic (after removing the route target information in the control portion) to cloud provider 201A. Cloud provider 201A receives and processes the traffic, and generates response traffic to send back to the device at customer network 211A. The response traffic includes the source IP address and source port from the received traffic, listed as the destination IP address and destination port.

Cloud provider 201A then sends the response traffic to cloud VRF device 203A, which determines the source and destination of the traffic and assign a route target to a control portion of the traffic before forwarding the traffic to RT Crossconnect device 204. RT Crossconnect device 204 receives the traffic and determines the route target embedded in the control portion, uses the route target and other information about the traffic to determine an exported route target corresponding to the destination referenced in the traffic, and reformats the control portion of the traffic to include that exported route target. RT Crossconnect device 204 then forwards the traffic to customer VRF device 205A. Customer VRF device 205A forwards the traffic (after removing the route target information in the control portion) to NAT facility 207. NAT facility 207 processes the traffic using zone policies, zone screens, or interface policies. NAT facility may also determine a private IP address associated with the destination IP address and port listed in the traffic to determine the IP address for the device associated with customer network 211A that sent the request traffic, and forwards the traffic to customer network 211A for sending to that device.

Figure 3:
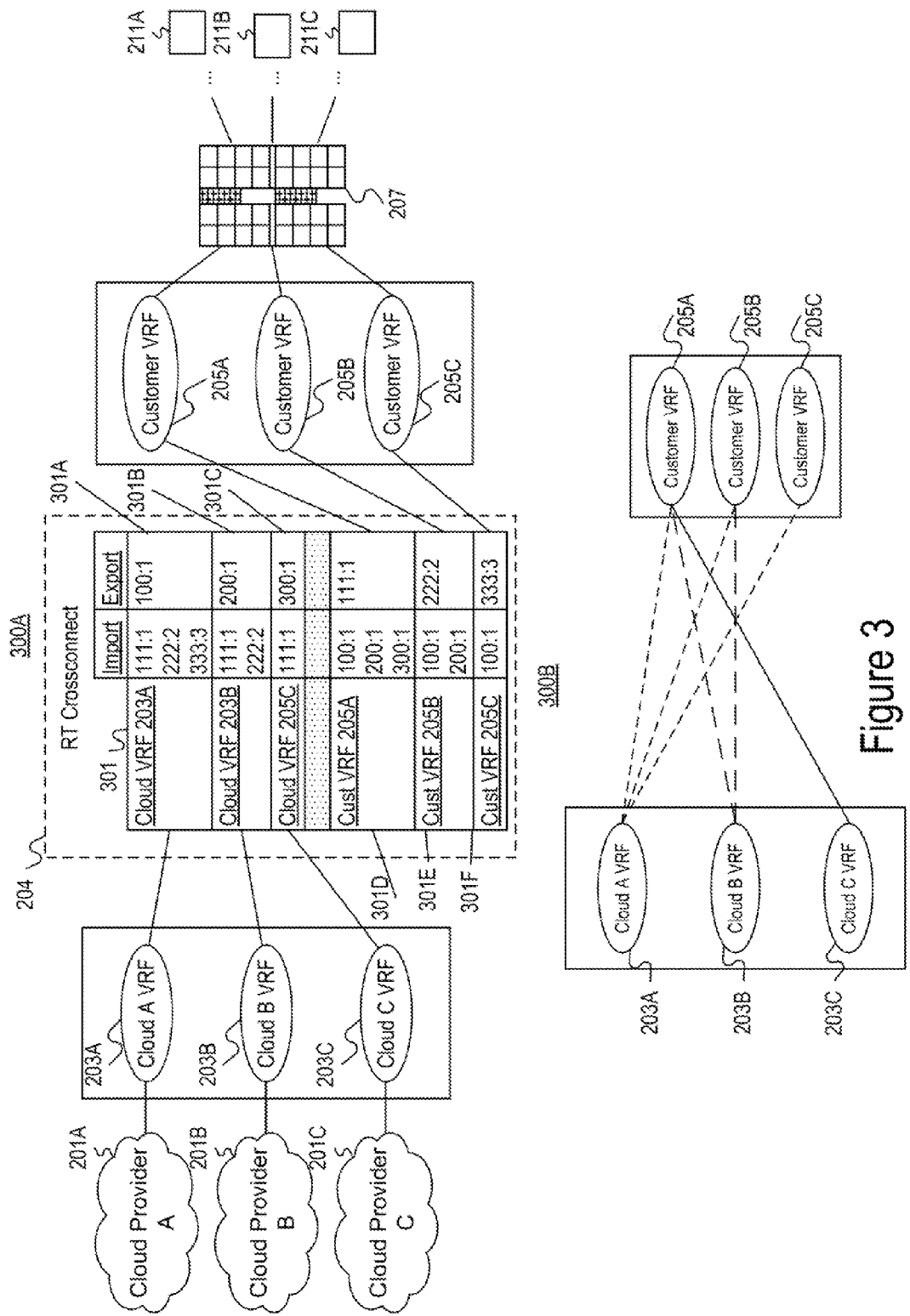
FIG. 3 is a diagram showing example routes between devices, using a cross-connection system and Virtual Routing and Forwarding (VRF) devices, consistent with disclosed embodiments.

Diagram 300A of FIG. 3 presents a closer view of the routing between customer VRFs 205A-205C and cloud VRF devices 203A-203C. Diagram 300B of FIG. 3 presents the virtual connections made by the devices depicted in diagram 300A.

In accordance with some embodiments, devices associated with customer network 211A-211C may establish connections with multiple cloud providers 201A-201C simultaneously. For example, a device associated with customer network 211A may connect to cloud provider 201A in order to access resources stored at cloud provider 201A, and may also connect to cloud provider 201C to initiate a data processing request. Diagram 300A shows connections between cloud VRF devices 203A-203C and customer VRF devices 205A-205C. These connections are a representation of the routes between the VRF devices. The route targets in RT Crossconnect 204 represent routes between customer VRF devices 205A-205C and cloud VRF devices 203A-203C. In some embodiments, these routes may be provisioned for use by devices associated with customer networks 211A-211C, enabling access to particular cloud providers 201A-201C. For example, if a customer operating customer network 211B wants to access cloud providers 201A and 201B, RT Crossconnect device 204 may implement those cross-connections with route targets that enable only those connections. The route targets may be used to control the routes that are accepted ("imported") or advertised ("exported") into the routing table. If there is no provisioned route between a particular customer network and a particular cloud provider, RT Crossconnect device 204 will not route traffic from that customer network to that cloud provider. In some embodiments, RT Crossconnect device 204 may provision routes to a customer network customer associated with that network leases, buys, rents, or otherwise gains access to, such routes.

As represented in diagram 300B, customer VRF 205A has established "connections" to all of cloud VRF devices 203A, 203B, and 203C. The connections in diagram 300B are implemented using route targets through RT Crossconnect device 204. Devices that connect to customer VRF device 205A (e.g., devices located on customer network 211A) may access any of cloud providers 201A-201C through a tunneled, secure, or other connection. Similarly, as represented in diagram 300B, cloud VRF device 203A is connected to each of customer VRF devices 205A, 205B, and 205C, and cloud VRF device 203C is connected only to customer VRF device 205A. This enables cloud VRF device 203A to access any of customer VRF devices 205A-205C, and enables cloud VRF device 203C to only access customer VRF devices 205C.

In some embodiments, RT Crossconnect device 204 stores table 301, which contains references to customer VRF devices 205A-205C and cloud VRF devices 203A-203C. Table 301 may comprise multiple instances for routing traffic between different these VRF Devices. Example table 301 contains six instances for representing routes between connected VRF devices. Table 301 contains instances 301A-301C, which indicates route exchanges between cloud VRF devices 203A-203C and customer VRF devices 205A-205C. In some embodiments, as mentioned above, instances 301A-301C represent routes explicitly provisioned by the customers operating customer networks 211A-211C and/or by the providers operating cloud providers 201A-201C. Similarly, instances 301D-301F represent routes from customer VRF devices 205A-205C to cloud VRF devices 203A, 203B, and 203C. RT Crossconnect 204 may use both sets of instances (i.e., instances 301A-301C and 301D-301F) to determine the proper route target for routing traffic between cloud VRF devices 203A-203C and customer VRF devices 205A-205C. RT Crossconnect device 204 may route such traffic by receiving the traffic, determining a route target from the control portion of the traffic, determining an exported route target based on information contained In table 301, looking up the destination in the instances corresponding to possible destinations, and routing the traffic to the appropriate destination.

Instance 301A represents routes between cloud VRF device 203A and each of customer VRF devices 205A-205C. As shown in 300B, cloud VRF 203A has established a connection to customer VRF devices 205A-205C. (This could be, for example, a VPN connection, a tunnel, or the like.) The routes are represented as imported route targets 111:1, 222:2, and 333:3 and an exported route target of 100:1. RT Crossconnect device 204 may reformat incoming traffic including an "imported" route target, to include the "exported" route target associated with that traffic. In example FIG. 3, table 301 indicates that Cloud VRF device 203A "imports" route targets 111:1, 222:2, and 333:3 (instance 301A), Cloud VRF device 203B "imports" route targets 111:1 and 222:2 (instance 301B), and Cloud VRF device 203C "imports" only the 111:1 route target (instance 301C).

Route targets enable communication between multiple cloud providers 201A-201C and multiple devices at customer networks 211A-211C. In some embodiments, only VRF devices (such as customer VRF devices 205A-205C and cloud VRF devices 203A-203C) utilize route targets, as a way of differentiating between traffic that could otherwise appear to be directed to the same destination. In some embodiments, each of cloud VRF device 203A-203C and customer VRF devices 205A-205C have routing tables that assign route targets to the control portion of traffic received from neighboring devices. For example, customer VRF device 205A may receive traffic originally from customer network 211A and assign a route target to the control portion of the traffic. If customer networks 211A and 211B both use the same address space (10.0.0.x, where x is an integer from 0-255), and devices on both of customer networks 211A and 211B connect to cloud VRF device 203A, cloud device 203A would not be able to uniquely refer to devices on either of those networks, because it would be difficult to distinguish between 10.0.0.2 on customer network 211A and 10.0.0.2 on customer network 211B. By applying route targets to the incoming traffic before sending it to RT Crossconnect device 204, customer VRF devices 205A-205C can inform RT Crossconnect device 204 how to route traffic between devices at cloud providers 201A-201C and customer networks 211A-211C.

Instances 301D-301F represent routes from customer VRF devices 205A-205C to cloud VRF devices 203A-203C. For example, as represented in diagram 300B, customer VRF device 205A is connected to cloud VRF devices 203A, 203B, and 203C. Customer VRF device 205C is connected only to cloud VRF device 203A. The routes imported by customer VRF device 205A include 100:1, 200:1, and 300:1. This corresponds to routes exported by cloud VRF device 203A, 203B, and 203C, respectively.

Instance 301F represents a single cross connection between customer VRF device 205C and customer VRF device 203A. Instance 301F references one imported route target (100:1) as being associated with one exported route target (333:3). The routing in instance 301F represents cloud VRF device 203A, because it is the only cloud VRF device that customer VRF device 205C has a connection to.

Together, instances 301A-301F indicate routes that RT Crossconnect 204 can send traffic over when it is received from either of cloud VRF devices 203A-203C or customer VRF devices 205A-205C. RT Crossconnect 204 may use instances 301A-301F in determining routes for traffic between these devices. For example, if RT Crossconnect 204 receives traffic from cloud VRF device 203A corresponding to the "111:1" route target, RT Crossconnect 204 may consult table 301 to determine that instance 301A corresponds to cloud VRF device 203A, and may consult instance 301A to determine the proper routing for the traffic. RT Crossconnect 204 may determine, from instance 301A, that when traffic from cloud VRF device 203A corresponds to route target "111:1," the traffic should be reformatted to include the "100:1" route, and routed to Customer VRF 205A.

Figure 4:
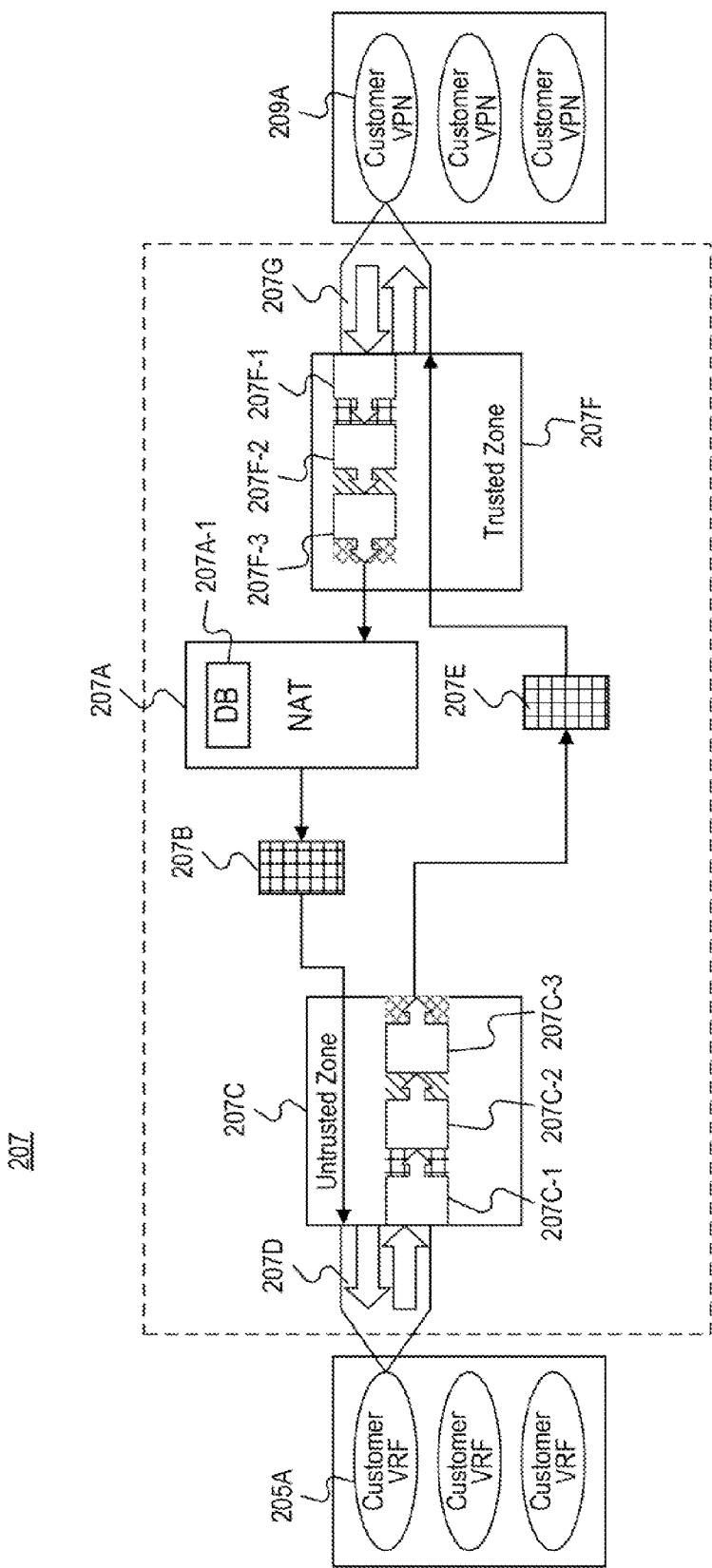
FIG. 4 is a diagram of an example NAT facility, consistent with disclosed embodiments.

FIG. 4 shows a detailed view of NAT facility 207 and related connections to customer VRF device 205A and customer VPN device 209A. NAT facility 207, in some embodiments, may be implemented as one or more devices operable to receive data from a first device, perform operations on the data, and send the data to a second device. In some embodiments, NAT facility 207 may be implemented using multiple computers, software implemented on an electronic device, hardware, firmware, or the like.

NAT facility 207 includes, for example, a NAT device 207A, a trusted-to-untrusted firewall 207B, an untrusted zone 207C, a NAT outside interface 207D, an untrusted-to-trusted firewall 207E, a trusted zone 207F, and a NAT inside interface 207G. Each of the elements depicted in NAT facility 207 may be implemented as electronic devices, hardware, software, firmware, or the like.

NAT inside interface 207G may be implemented as a network interface for connecting to customer VPN 209A. Customer VPN device 209A is connected to NAT facility inside interface 207G, and may send traffic to NAT facility 207 through NAT inside interface 207G. NAT inside interface 209A may also be configured to consult table 207A-1 to determine an IP address associated with a device located on a customer network connected to customer VPN device 209A, and may be configured to send traffic to that device.

Trusted zone 207F, in some embodiments, may be implemented as a device or software for filtering data using policies and screens. In example FIG. 4, trusted zone 207F comprises interface policy software 207F-1, zone policy software 207F-2, and zone screen software 207F-3. Interface policy software 207F-1, zone policy software 207F-2, and zone screen software 207F-3 may filter, direct, or shape traffic that is routed by NAT inside interface 207G to trusted zone 207F. The particular order of interface policy software 207F-1, zone policy software 207F-2, and zone screen software 207F-3 is provided as an example and may vary in some embodiments.

Interface policy software 207F-1, in some embodiments, may permit particular services and/or protocols to operate. Interface policy software 207F-1 may permit or block particular services based on a determination of which interface in NAT facility 207 the traffic originated from, Zone policy software 207F-2, in some embodiments, may permit or block particular services and/or protocols. For example, if NAT inside interface 207G receives FTP traffic and zone policy software 207F-2 does not allow FTP traffic, zone policy 207F-2 may silently drop all FTP traffic.

Zone screen software 207F-3, in some embodiments, may perform packet filtering to prevent network-based attacks. For example, zone screen software 207F-3 may be implemented as an intrusion prevention software system programmed to recognize network-based attacks. Zone screen software 207F-3 may recognize such attacks by examining incoming traffic (e.g., malformed or oversized packets) or thresholds related to traffic (e.g., too many of the same packet at one time). Some network-based attacks that zone screen software 207F-3 may be configured to recognize and/or prevent may include: ICMP floods (e.g., sending thousands or millions of 'ping' packets, or sending 'ping' packets larger than would be expected), SYN floods (e.g., a device sending "synchronize" packets requesting a connection from a remote host, in an attempt to overload the host's ability to respond to other connection requests), IP source-route attacks (where an attacker sends a packets to a host inside a network, in order to determine the computers between the attacker and the host), option attacks, TCP SYN-FIN attacks (determining which hosts are alive by sending 'SYN' packets, or by sending a 'FIN' packet requesting that a remote host close a connection, when no connection had been made), TCP sequence attacks, or the like.

NAT device 207A may be configured as a device enabled to route traffic from multiple devices with private IP addresses, through a smaller set of globally unique IP addresses, to devices elsewhere on the Internet. NAT device 207A, in some embodiments, receives traffic from trusted zone 207F, determines the address from which the traffic originated and the destination address to which the traffic is directed, and determines whether a connection has already been established between the originating address and the destination address.

If no connection was previously established, NAT device 207A may assign a new port to the traffic, store that port with information from the traffic (such as a source IP address, a source port, a destination IP address, and a destination port) in a table 207A-1 to enable routing to the originating device at customer VPN 209A, and reformat the traffic to appear as though it is coming from a globally unique IP address at the new assigned port. If, however, a connection was previously established, NAT device 207A may determine the port that was assigned to previous traffic in this connection (e.g., by searching table 207A-1) and assign the same port to the new traffic.

In order to assign globally unique IP addresses to outgoing traffic, NAT device 207A may assign traffic from different customer VPN devices 209A-209C to different NAT pools. A NAT pool, in some embodiments, enables a set of devices (such as a customer's devices connected to customer VPN 209A) to utilize a set of globally unique addresses in communicating with devices on another network, such as the Internet. NAT device 207A may dynamically assign traffic to each of the addresses in a pool of multiple globally unique IP addresses.

In some embodiments, NAT device 207A may assign one of the globally unique IP addresses to traffic originating from each device at customer VPN 209A on an as-needed basis. For example, if NAT device 207A implements a NAT pool of globally unique addresses, each connection initiated from a device connected to customer VPN 209A will be allocated to a first globally unique IP address (e.g., the IP address with the lowest number). After allocating a number of connections to a first globally unique IP address, NAT device 207A may determine that all ports assigned to the first globally unique IP address have been assigned. Upon receiving a new connection from a device connected to customer VPN 209A, NAT device 207A may allocate that traffic to a second of the globally unique addresses.

NAT pools may be defined on a per-customer basis. For example, each of customer VPN devices 209A-209C may have a respective NAT pool assigned to connected devices. NAT pools may also be defined on the basis of geographic region. So, if customer VPN devices 209A and 209B are both operated by the same customer, but VPN device 209A is allocated to computers on the east coast of the United States and VPN 209B is allocated to computers on the west coast of the United States, NAT device 207A may assign a first NAT pool to devices connected to VPN device 209A and a second NAT pool to devices connected to VPN device 209B.

NAT device 207A may also define various parameters for each NAT pool that it assigns device traffic to. For example, NAT device 207A may define session timeouts for NAT pools, indicating a time period after which a connection between a device on one of customer VPN devices 209A-209C and a device on another network is assumed to be terminated (e.g., if no traffic associated with that connection has been observed after a period of time). After this time period passes, the globally unique IP address and port assigned to the connection may be cleared from table 207A-1, freeing up that combination for another connection with an outside device.

NAT device 207A may also implement proxy Address Resolution Protocol (or "proxy ARP"). For example, if NAT device 207A receives an ARP request from a device on another network (such as through customer VRF 205A) which requests a hardware address (e.g., a MAC address) from a device connected to customer VPN 209A, NAT device 207A may respond with its own hardware address. This enables NAT device 207A to receive traffic intended for the device connected to customer VPN 209A and forward it to the device connected to customer VPN device 209A.

Trust-to-untrust firewall 207B may filter (i.e., block) traffic based on the content of the traffic. For example, firewall 207B may filter traffic if it contains particular source addresses, destination addresses, application information, is directed to a particular service or protocol, or the like.

Untrusted zone 207C, in some embodiments, may be implemented as a device or software for filtering data using policies and screens. In some embodiments, traffic forwarded from firewall 207B to untrusted zone 207C is not filtered. Customer VRF device 205A is connected to NAT facility 207 via NAT outside interface 207D. Customer VRF device 205A may forward traffic received from NAT facility 207 to RT Crossconnect device 204 for routing to an appropriate cloud provider 201A-201C. (For example, if the traffic sent by a device on customer network 211A references a request for data, the response traffic may contain the referenced data.)

NAT outside interface 207D may receive the traffic and forward it to untrusted zone 207C for filtering. Untrusted zone 207C comprises interface policy software 207C-1, zone policy software 207C-2, and zone screen software 207C-3. Interface policy software 207C-1, zone policy software 207C-2, and zone screen software 207C-3 may filter, direct, or shape traffic that is routed by NAT inside interface 207G to trusted zone 207C. The particular order of interface policy software 207C-1, zone policy software 207C-2, and zone screen software 207C-3 is provided as an example and may vary in some embodiments. Each of 207C-1, 207C-2, and 207C-3 may be implemented in a manner similar to the software described above with respect to trusted zone 207F (i.e., interface policy software 207F-1, zone policy software 207F-2, and zone screen software 207F-3, respectively)

Firewall 207E may filter (i.e., block) traffic based on the content of the traffic. For example, firewall 207E may filter traffic if it contains particular source addresses, destination addresses, application information, is directed to a particular service or protocol, or the like.

An example process for sending and receiving traffic would include receiving request traffic from customer VPN device 209A through NAT inside interface 207G, which forwards the traffic to trusted zone 207F. Trusted zone 207F may filter the traffic through interface policy software 207F-1, zone policy software 207F-2, and zone screen software 207F-3, and then may forward traffic to NAT device 207A. NAT device 207A may reformat the traffic to list a new source IP address and source port, and store that information in table 207A-1. The new source IP address may be assigned from a NAT pool. NAT device 207A may then send the traffic with the new source IP address to trust-to-untrust firewall 207B, which may filter/block the traffic based on its contents, and forward the traffic to untrusted zone 207C. Untrusted zone 207C may then forward the traffic through NAT outside interface 207D for sending to customer VRF device 205A.

Customer VRF device 205A may then receive response traffic (e.g., from RT Crossconnect device 204 in FIG. 3) and may forward the response traffic to NAT outside interface 207D. NAT outside interface 207D may forward the response traffic to untrusted zone 207C, which may filter the traffic through interface policy software 207C-1, zone policy software 207C-2, and zone screen software 207C-3. After filtering, untrusted zone 207C may forward the traffic to untrust-to-trust firewall 207E for further filtering. Untrust-to-trust firewall 207E may forward the traffic through NAT inside interface 207G for sending to customer VPN device 209A and ultimately to the device that sent the original request traffic.

Figure 5A:
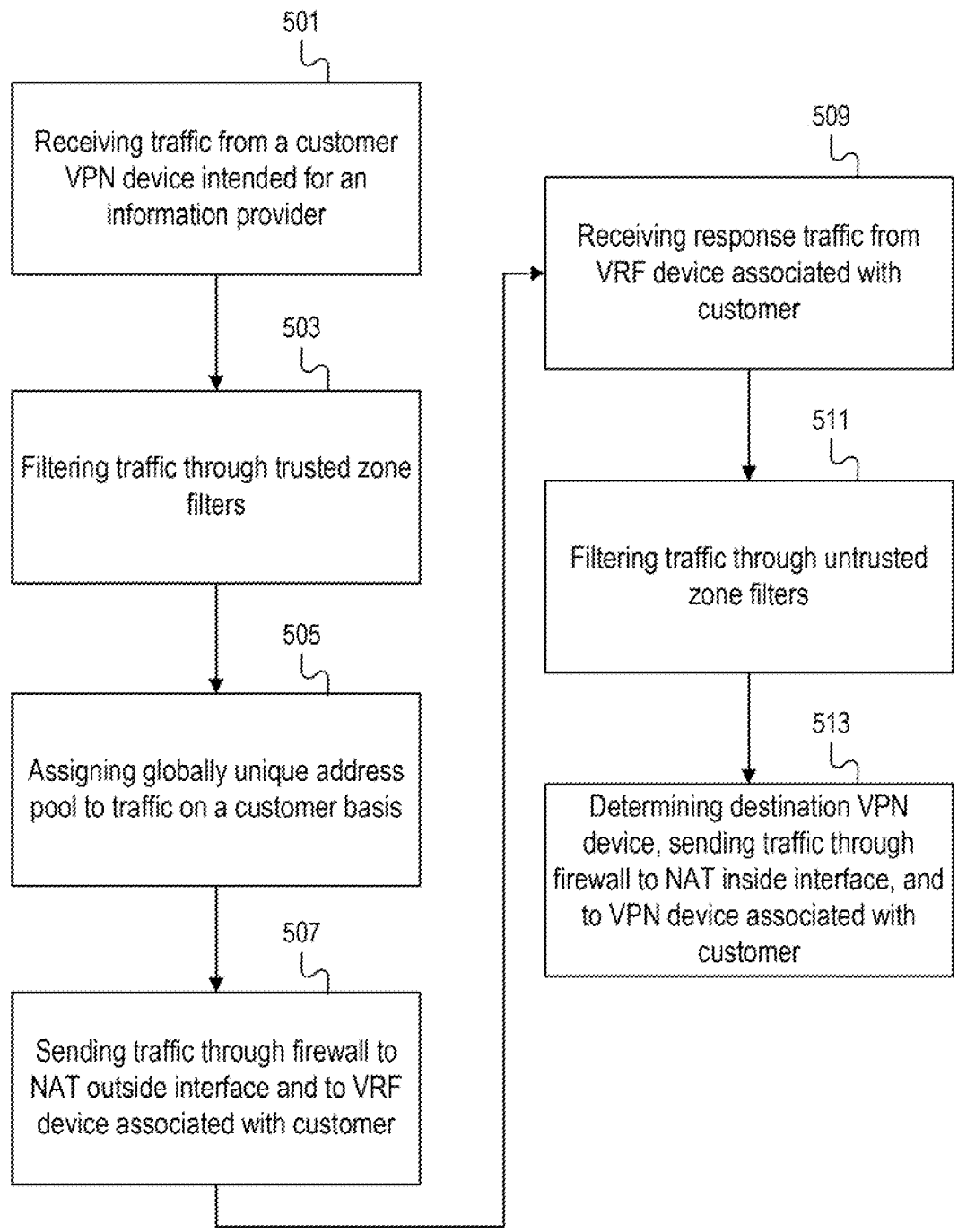
FIG. 5A is a flowchart of an example process for forwarding traffic using a NAT facility, consistent with disclosed embodiments.

FIG. 5A is a flowchart representing operations performed at a network address translation facility, such as NAT facility 207 in FIG. 4. Reference is made to particular components in FIGS. 3 and 4, but it should be understood that the process represented in this flowchart may be performed using a variety of devices or systems.

In step 501 traffic is received from a customer VPN device, such as customer VPN device 209A in FIG. 4. The traffic may originate from a device connected to customer VPN device 209A, and may be intended for a particular cloud provider (e.g., one of cloud providers 201A-201C). Customer VPN device 209A enables one or more devices connected to it to communicate with information providers over a secure connection.

In step 503, NAT facility 207 filters the incoming traffic through filters in trusted zone 207F as described above with respect to FIG. 3. In some embodiments, step 503 may include filtering traffic through at least one of zone policy software, zone screen software, or interface policy software.

In step 505, NAT pool device 207A assigns a globally unique address pool to the incoming traffic. In some embodiments, assigning an address pool to incoming traffic includes steps of rewriting packets included in the traffic to list a different source IP address, such as an IP address associated with a pool of NAT addresses.

NAT pool device 207A consults or references table 207A-1 to determine whether traffic associated with customer VPN 209A has already been assigned to a particular address pool. If so, the traffic received in step 501 may also be assigned to that pool by rewriting the traffic to contain an IP address associated with a pool of NAT addresses.

In step 505 NAT pool device 207A may also determine whether other traffic from customer VPN device 209A is from the same region as traffic from another VPN device. NAT pools, in some embodiments, may also be defined on the basis of geographic region. So, if two customer VPN devices are both operated by the same customer, but one VPN device is allocated to computers on the east coast of the United States and another VPN device is allocated to computers on the west coast of the United States, NAT device 207A may assign traffic from each device to different NAT pools.

In step 507, NAT facility 207 sends the traffic through a firewall to a NAT outside interface, and to a VRF device associated with the customer. For example, as explained above with respect to FIG. 4, NAT facility 207 may forward traffic through a firewall such as firewall 207B, through untrusted zone 207C, and to customer VRF device 205A. Customer VRF device 205A and customer VPN device 209A may be provisioned to (e.g., leased, sold, or rented by) the customer that operates customer network 211A.

In step 509 the traffic is received. The received traffic may comprise a response to the traffic sent in step 507. For example, if the traffic in step 507 is from customer VPN device 209A and requests particular data from an information provider (such as cloud provider 201A in FIG. 3), NAT facility 207 may receive that particular data for sending back to customer VPN device 209A (and/or devices connected to customer VPN device 209A). Because the traffic was reassigned to an address associated with a NAT pool in step 505 before being sent in step 507, the traffic received in step 509 may include a destination address that is in that NAT pool.

In step 511, NAT facility 207 filters the incoming traffic through filters in an untrusted zone. Because traffic is flowing from external sources to devices behind a firewall (e.g., devices connected to customer VPN 209A), applying filters on the traffic can prevent network-based attacks from taking place against the devices behind the firewall. In some embodiments, step 511 may include filtering incoming traffic through at least one of zone policy software, zone screen software, or interface policy software.

In step 513, NAT facility 207 determines a destination VPN device based on information in the traffic. For example, the traffic may list as the destination address an address in a previously-allocated NAT pool. NAT facility 207 may determine the appropriate destination customer VPN device by searching for the destination address and/or port in table 207A-1. Step 513 also represents an optional step of forwarding the traffic through a firewall to the appropriate destination customer VPN device 209A.

Figure 5B:
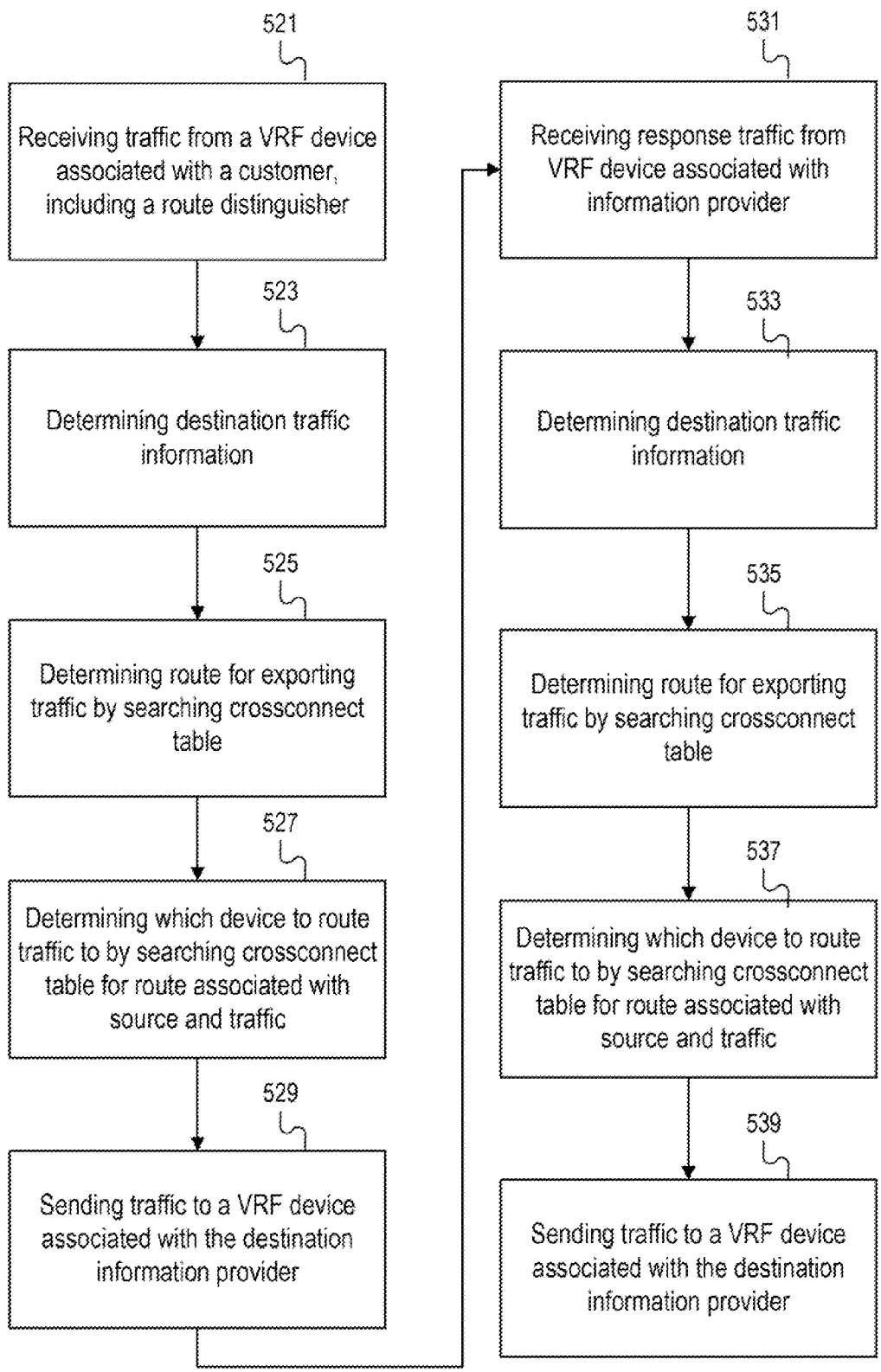
FIG. 5B is a flowchart of an example process for forwarding traffic using a cross-connection system, consistent with disclosed embodiments.

FIG. 5B is a flowchart of operations performed at a cross-connecting system, such as RT Crossconnect device 204 in FIG. 3A. Reference is made to particular components in FIGS. 3 and 4, but it should be understood that the process represented in this flowchart may be performed using a variety of devices or systems.

In step 521, RT Crossconnect device 204 receives traffic from a customer VRF device. For example, traffic received in step 521 may have been received by a VRF device, as explained above with respect to step 507 of FIG. 5A, and forwarded to RT Crossconnect device 204. In some embodiments, the control portion of the traffic may include a route target. The route target may be applied to the control portion of the traffic to a customer VRF device, to enable RT Crossconnect device 204 to route traffic between the customer VRF device and a cloud VRF device.

Route targets may be a number or numbers used to uniquely identify traffic from VPN devices (such as customer VPN devices 209A-209C). Since devices located at customer networks behind different VPN devices may have similar private IP addresses, route targets enable a cross-connect device (such as RT Crossconnect 204) to determine the proper routing for traffic by using unique routing tables.

In step 523, RT Crossconnect device 204 determines destination information based on the information contained in the received traffic. For example, RT Crossconnect device 204 may determine that the received traffic contains a route target in the control portion of the traffic that identifies a particular route. For example, traffic from Customer VRF device 205C may contain a route target such as 100:1.

Step 525 represents a process by which RT Crossconnect device 204 determines the proper routing for traffic based on the imported route target. For example, RT Crossconnect device 204 may determine that the control portion of traffic received from customer VRF device 205C contains a route target of 100:1, which corresponds to route target 333:3.

After determining the proper route target for sending the traffic in step 525, RT Crossconnect device 204 determines where the traffic should be sent in step 527. For example, RT Crossconnect device 204 may determine the proper routing for the traffic by looking for the route target embedded in the control portion of the traffic and finding a destination device matching that route target in table 301. For example, if traffic received from customer VRF device 205C includes a route target of 100:1, RT Crossconnect device will reformat the route target in the control portion of the traffic to read 333:3.

By learning (importing) or advertising (exporting) routes as desired from cloud VRF devices or customer VRF devices, RT Crossconnect device can determine and record connections between various sets of devices. In step 527, RT Crossconnect device 204 may then locate the determined route target (333:3) in the table, and determine that it corresponds to instance 301A. To determine which of the instances corresponds to the route target, and thus which of the VRF devices should receive the traffic, RT Crossconnect device 204 may search instances 301A, 301B, and 301C for an exported route of 100:1, which corresponds to the original route, and determine that instance 301A contains both an exported route corresponding to original route target 100:1, and an imported route corresponding to determined route target 333:3.

In step 529, RT Crossconnect routes received traffic. For example, if traffic from customer VRF device 205C contains a route target of 100:1, which RT Crossconnect device 204 determines to export to route 333:3 and thus to cloud VRF device 203A, RT Crossconnect device 204 may route the traffic to cloud VRF device 203A for sending to cloud provider 201A.

In response, a cloud provider may respond with response traffic and may forward the response traffic to the appropriate cloud VRF device. For example, if the traffic routed by RT Crossconnect represents a request for particular information from a cloud provider, the appropriate cloud provider may respond with response traffic including that particular information.

In step 531, RT Crossconnect device 204 receives the response traffic routed to it from a cloud VRF device. In some embodiments, this response traffic may include a route target usable by RT Crossconnect device 204 to route traffic back to its destination, and may have been inserted into the traffic by the VRF device sending the traffic.

In step 533, RT Crossconnect device 204 determines destination information based on the information contained in the received response traffic. As described above with respect to step 523, RT Crossconnect device 204 may determine that the received traffic contains a route target that identifies a particular route. For example, as described above with reference to example FIG. 3, traffic from cloud VRF device 203A may contain a route target such as 333:3.

In step 535, RT Crossconnect device 204 determines the proper routing for traffic based on the imported route target. In this step, RT Crossconnect device 204 may determine an appropriate exported route target from table 301. Continuing the above example, RT Crossconnect device 204 may determine that traffic from cloud VRF device 203A contains a route target of 333:3, and in step 535 may determine that the route target for routing the traffic is 100:1.

In step 537, RT Crossconnect device 204 determines the appropriate routing for the traffic based on the route target determined in step 535 and the route target in the response traffic received in step 531. Continuing with the above examples, if RT Crossconnect device 204 receives traffic that corresponds to an exported route target for which there appear to be multiple destinations, RT Crossconnect device 204 may cross-reference both the original route target and the determined route target to determine a destination for the traffic.

Note that cloud VRF device 203A in example diagram 300B of FIG. 3 has connections to all of customer VRF devices 205A-205C.

As an illustrative example, if, in step 531, RT Crossconnect device 204 receives traffic from cloud VRF device 203A with a route target of 333:3, RT Crossconnect device 204 determines in step 535 that the destination route is 100:1, because instance 301D lists a correspondence between 333:3 as an imported route and 100:1 as an exported route. RT Crossconnect device 204 may then locate the determined route target (100:1) in the table, and determine that it corresponds to instances 301D, 301E, and 301F. To determine which of the instances corresponds to the route target, and thus which of the VRF devices should receive the traffic, RT Crossconnect device 204 may search instances 301D, 301E, and 301F for an exported route of 100:1, which corresponds to the original route, and determine that instance 301F contains both an exported route corresponding to original route target 333:3 and an imported route corresponding to determined route target 100:1.

In step 539, RT Crossconnect device 204 routes the response traffic along the route as determined in step 537. For example, if traffic from cloud VRF device 203A contains a route target of 333:3, which RT Crossconnect device 204 determines to export to routes importing 100:1 and thus to customer VRF device 205C, RT Crossconnect device 204 may route the response traffic to customer VRF device 205C for sending to a device at customer network 211C.

Figure 6A:
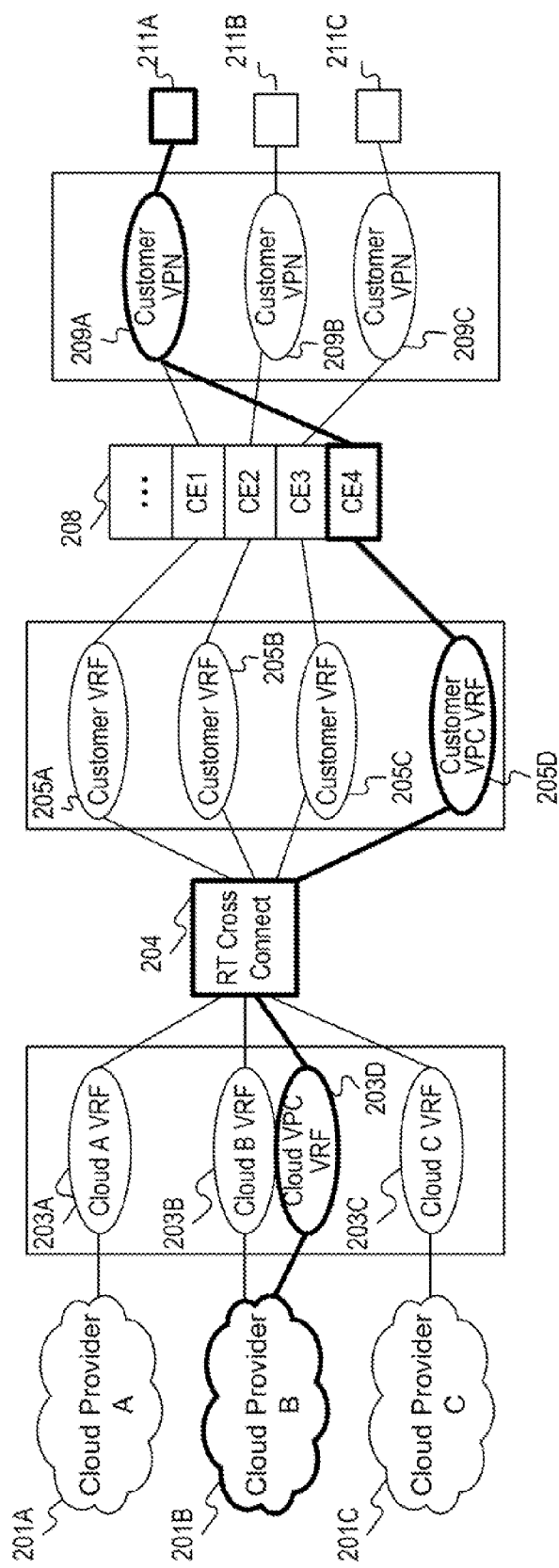
FIG. 6A is a diagram of devices for routing and forwarding traffic between devices on a network, consistent with disclosed embodiments.
Figure 6B:
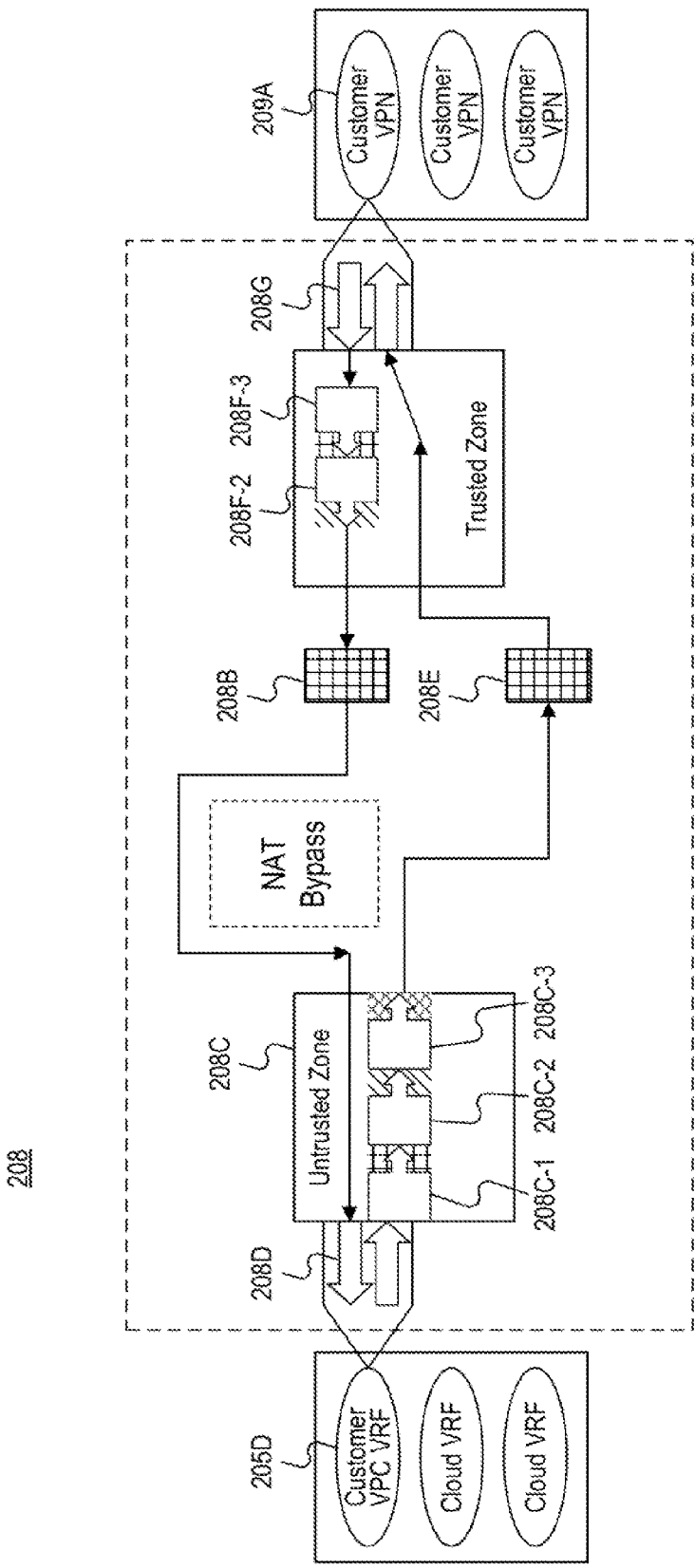
FIG. 6B is a diagram of an example NAT facility, consistent with disclosed embodiments.

FIGS. 6A and 6B depict a variation on embodiments described in this disclosure. In this variation, embodiments may employ dedicated "Virtual Private Cloud" (VPC) VRF devices which are only used by a particular customer for communicating with a cloud provider. By dedicating VPC VRF devices to a particular customer, that customer can receive increased speed and reliability when communicating with cloud providers. Using VPC VRF devices as depicted in FIGS. 6A and 6B enable, for example, exclusive use by one customer of computing resources at a cloud provider.

In example FIG. 6A, the customer associated with customer VPN 209A may route traffic through a dedicated CE device at NAT facility 208 (described below with respect to FIG. 6B) to a dedicated customer VPC VRF device 205D. Customer VPC VRF device 205D may route traffic to RT Crossconnect device 204, using route targets (as explained above with respect to FIGS. 3 and 5B). RT Crossconnect device 204, using a routing table (such as table 301 in FIG. 3) may route the traffic to cloud VPC VRF device 203D which is connected to cloud provider 201B. (The table in RT Crossconnect device 204 may contain an instance which routes traffic between customer VPC VRF device 205D and cloud VPC VRF device 203D.) As referred to above, cloud provider 201B may have particular computing resources (e.g., a virtual machine or a computer) for exclusive use by devices at customer network 211A. Customer VPC VRF devices 205D and cloud VPC VRF device 203D enable traffic to flow between customer VPN device 209A and those particular resources at 201B.

FIG. 6B depicts NAT facility 208. NAT facility 208, in some embodiments, may be implemented as a computer operable to receive data from a first device, perform operations on the data, and send the data to a second device. In some embodiments, NAT facility 208 may be implemented as at least one device, software code, hardware, or firmware, and may be dedicated to routing traffic between customer VPN 209A and corresponding customer VPC VRF device 205D.

NAT facility 208 includes, for example, a trusted-to-untrusted firewall 208B, an untrusted zone 208C, a NAT outside interface 208D, an untrusted-to-trusted firewall 208E, a trusted zone 208F, and a NAT inside interface 208G. Each of the elements depicted in NAT facility 208 may be implemented as electronic devices, hardware, software, firmware, or the like.

NAT inside interface 208G may be implemented as a network interface for connecting to customer VPN 209A. Customer VPN device 209 is connected to NAT facility inside interface 208G, and may send traffic to NAT facility 208 through NAT inside interface 208G.

Trusted zone 208F, in some embodiments, may be implemented as a device or software module(s) for filtering data using policies and screens. In example FIG. 6B, trusted zone 208F comprises interface policy software 208F-1 and zone policy software 208F-2. In some embodiments, NAT facility 208 depicted in FIG. 6B does not require zone screen software (as in similar FIG. 4 representing NAT facility 207). Traffic passing through NAT facility 208 is related only to a particular customer. Because traffic from example customer network 211A to customer VPC VRF device 205D, it is less likely that the customer will attempt to overload or hack the computing resources he has leased at the cloud provider.

Interface policy software 208F-1 and zone policy software 208F-2 may filter, direct, or shape traffic that is routed by NAT inside interface 208G to trusted zone 208F. The particular order of interface policy software 208F-1 and zone policy software 208F-2 is provided as an example and may vary in some embodiments.

Interface policy software 208F-1, in some embodiments, may permit particular services and/or protocols to operate. Interface policy software 208F-1 may permit or block particular services based on a determination of which interface in NAT facility 208 the traffic originated from, Zone policy software 208F-2, in some embodiments, may permit or block particular services and/or protocols. For example, if NAT inside interface 208G receives FTP traffic and zone policy software 208F-2 does not allow FTP traffic, zone policy 208F-2 may silently drop all FTP traffic.

Firewall 208B may filter (i.e., block) traffic based on the content of the traffic. For example, firewall 208B may filter traffic if it contains particular source addresses, destination addresses, application information, is directed to a particular service or protocol, or the like. In some embodiments, firewall 208B may operate in a manner similar to firewall 207B in FIG. 4. Embodiments using VPC VRF device 205D however may implement less stringent filtering. This is because embodiments using VPC VRF device 205D and do not require as much security because the customer is communicating with a VPC VRF device that is being provisioned to that customer alone.

Untrusted zone 208C, in some embodiments, may be implemented as a device or software module(s) for filtering data using policies and screens. In some embodiments, traffic forwarded from firewall 208B to untrusted zone 208C is not filtered, because it was already filtered when passing through trusted zone 208F.

Customer VPC VRF device 205D is connected to NAT facility 208 via NAT outside interface 208D. As explained above with respect to FIG. 6A, customer VPC VRF device 205A may forward traffic received from NAT facility 208 to RT Crossconnect device 204 for routing to an appropriate cloud provider 201A-201C through cloud VPC VRF device 203D. (For example, if the traffic sent by a device on customer network 211A contained a request for data from cloud provider 201B, the response traffic may contain that requested data.)

Untrusted zone 208C may be implemented as a device or software module(s) for filtering data using policies and screens. In example FIG. 6B, untrusted zone 208C comprises interface policy software 208C-1, zone policy software 208C-2, and zone screen software 208C-3. Interface policy software 208C-1, zone policy software 208C-2, and zone screen software 208C-3 may filter, direct, or shape traffic that is routed by NAT inside interface 208G to trusted zone 208C. The particular order of interface policy software 208C-1, zone policy software 208C-2, and zone screen software 208C-3 is provided as an example and may vary in some embodiments. Each of 208C-1, 208C-2, and 208C-3 may be implemented in a manner similar to the software described above.

Firewall 208E may filter (i.e., block) traffic based on the content of the traffic. For example, firewall 208E may filter traffic if it contains particular source addresses, destination addresses, application information, is directed to a particular service or protocol, or the like.

An example process for sending and receiving traffic would include receiving request traffic from customer VPN device 209A through NAT inside interface 208G, which forwards the traffic to trusted zone 208F. Trusted zone 208F may filter the traffic through zone policy software 208F-2, and zone screen software 208F-3, and then may forward traffic to trust-to-untrust firewall 208B, which may filter/block the traffic based on its contents, and forward the traffic to untrusted zone 208C. Untrusted zone 208C may then forward the traffic through NAT outside interface 208D for sending to customer VPC VRF device 205A.

Customer VPC VRF device 205A may then receive response traffic (e.g., from RT Crossconnect device 204 in FIG. 6A) and may forward the response traffic to NAT outside interface 208D. NAT outside interface 208D may forward the response traffic to untrusted zone 208C, which may filter the traffic through interface policy software 208C-1, zone policy software 208C-2, and zone screen software 208C-3. After filtering, untrusted zone 208C may forward the traffic to untrust-to-trust firewall 208E for further filtering. Untrust-to-trust firewall 208E may forward the traffic through NAT inside interface 208G for sending to customer VPN device 209A and ultimately to the device that sent the original request traffic.

Figure 7:
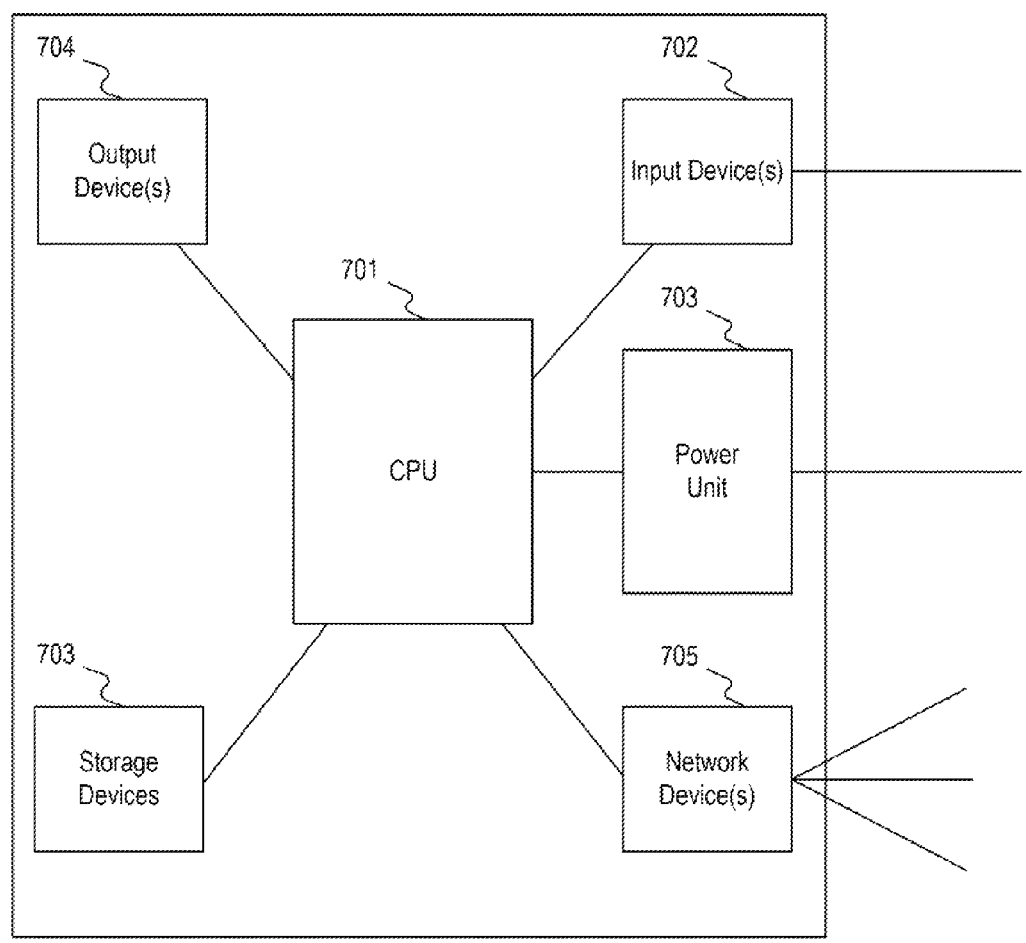
FIG. 7 is a diagram of an example electronic device for use in implementing disclosed devices.

FIG. 7 is an exemplary computing device 700, consistent with disclosed embodiments. Variations of computer device 700 may be used for implementing any or all of cloud providers 201A-201C, cloud VRF devices 203A-203C, RT Crossconnect device 204, customer VRF devices 205A-205C, NAT facility 207, NAT facility 208, customer VPN devices 209A, or devices on customer networks 211A-211C.

As shown in FIG. 7, exemplary computer device 700 may include one or more central processing units 701 for managing and processing data and operations consistent with the disclosed embodiments. CPU 701 may be configured to process data, execute software instructions stored in memory, and transmit data between the other components of device 700. For example, CPU 701 may be implemented as a mobile microprocessor, a desktop microprocessor, a server microprocessor, or any other type of processor.

In some embodiments, computer device 700 may also include one or more input devices 702, which are configured to receive input from a user, other computers, other devices, or other modules. Input devices 702 may include, but are not limited to, keyboards, mice, trackballs, trackpads, scanners, cameras, external storage or information devices, and other devices, which connect via Universal Serial Bus (USB), serial, parallel, infrared, wireless, wired, or other connections.

Computer device 700 may also include one or more storage devices 703. Storage devices 703 may be comprise optical, magnetic, signal, or any other type of memory configured to store information. Storage devices 703 may store, for example, data, instructions, programs/applications, operating systems, or a combination of these.

Computer device 700 also includes one or more output devices 704 that may be configured to transmit data to users and/or modules or devices. Such modules or devices may include, but are not limited to, computer monitors, televisions, screens, interface ports, projectors, printers, plotters, and other recording/displaying devices which connect via wired or wireless connections.

Computer device 700 may also include one or more network devices 705. Network device 705 may be configured to allow computer device 700 to connect to and exchange information with networks, such as the Internet, a local area network, a wide area network, a cellular network, a wireless network, or any other type of network. Network device 705 may be implemented as a wired network adapter, a wireless network adapter, an infrared network adapter, a cellular or satellite network adapter, or any other type of network adapter.

Computer device 700 may also include one or more power units 706, which may enable computer device 700 and its components to receive power and operate. While FIG. 7 illustrates the components in FIG. 7 as connected to CPU 701, other connections and configurations are possible, such as a "bus" or other connective links. Additionally, while the devices in FIG. 7 are represented in a singular form, in some embodiments, more than one of each of the devices in FIG. 7 may be implemented.

While FIG. 7 illustrates the components in FIG. 7 as connected to CPU 701, other connections and configurations are possible, such as a "bus" or other connective links. Additionally, while the devices in FIG. 7 are represented in a singular form, in some embodiments, each of the devices in FIG. 7 may be omitted, duplicated, or substituted.

Various embodiments have been described with reference to the accompanying drawings and embodiments. It will, however, be evident that various modifications and changes may be made thereto, and additional embodiments may be implemented, without departing from the present disclosure. The specification and drawings are accordingly to be regarded in an illustrative rather than restrictive sense.

For example, advantageous results may still be achieved if steps of the disclosed methods were performed in a different order and/or if components in the disclosed systems were combined in a different manner and/or replaced or supplemented by other components. Advantageous results may still be achieved if values or data were different than explicitly disclosed. Other implementations are also within the scope of the present disclosure.

It is to be understood that both the foregoing general description and the following detailed description are exemplary and explanatory only and are not restrictive of the disclosed embodiments, as claimed. Note also that, as used herein, the indefinite articles "a" and "an" mean "one or more" in open-ended claims containing the transitional words "comprising," "including," and/or "having."

The accompanying drawings, which are incorporated in and constitute a part of this specification, illustrate one or more embodiments and together with the description, serve to explain certain aspects of the disclosed embodiments.

What is claimed is:

1. A method comprising:
   receiving traffic from a first routing device wherein the traffic comprises a control portion that includes a first imported route target;
   accessing a table comprising a plurality of instances correlating a plurality of imported route targets including the first imported route target, a plurality of exported route targets, a plurality of destination devices, and a plurality of routing devices including the first routing device;
   locating in the table a first instance correlating the first routing device, the first imported route target, and a first exported route target included in the plurality of exported route targets;
   based on the first instance, locating in the table a second instance correlating the first imported route target, the first exported route target, and a first destination device included in the plurality of destination devices;
   and
   based on the second instance, routing the traffic to the first destination device.

2. The method of claim 1, wherein routing the traffic to the first destination device comprises reformatting the control portion of the traffic to contain the first exported route target.

3. The method of claim 1, wherein:
   the traffic further comprises a source IP address; and
   the source IP address in the traffic is associated with an IP address pool associated with a customer.

4. The method of claim 1, wherein the first destination device corresponds to a device provisioned to a customer; and wherein routing the traffic to the first destination device comprises:
   determining a destination routing device associated with the customer;
   reformatting the control portion of the traffic to contain the first exported route target; and
   sending the traffic to the destination routing device for forwarding to the first destination device.

5. A system, comprising:
   a storage device containing instructions; and
   at least one processor operable to execute the instructions to perform a method comprising steps of:
   receiving traffic from a first routing device, wherein the traffic comprises a control portion that includes a first imported route target;
   accessing a table comprising a plurality of instances correlating a plurality of imported route targets including the first imported route target, a plurality of exported route targets, a plurality of destination devices, and a plurality of routing devices including the first routing device;
   locating in the table a first instance correlating the first routing device, the first imported route target, and a first exported route target included in the plurality of route targets;
   based on the first instance, locating in the table a second instance correlating the first imported route target, the first exported route target, and a first destination device included in the plurality of destination devices;
   and
   based on the second instance, routing the traffic to the first destination device.

6. The system of claim 5, wherein routing the traffic to the first destination device comprises reformatting the control portion of the traffic to contain the first exported route target.

7. The system of claim 5, wherein:
the traffic further comprises a source IP address; and
the source IP address in the traffic is associated with an IP address pool associated with a customer.

8. The system of claim 5, wherein the first destination device corresponds to a device provisioned to a customer; and wherein routing the traffic to the first destination device comprises:
determining a destination routing device associated with the customer;
reformatting the control portion of the traffic to contain the first exported route target; and
sending the traffic to the destination routing device for forwarding to the first destination device.

9. A system, comprising:
at least one filtering device; and
at least one cross-connecting system, wherein:
the at least one filtering device comprises a storage device containing instructions and at least one processor, the processor configured to execute the instructions to perform a method of:
receiving traffic from at least one device associated with at least one customer,
assigning the at least one device to a globally unique address pool,
reformatting a control portion of the traffic to refer to at least one address in the globally unique address pool, and
forwarding the traffic to a first routing device associated with the at least one customer for sending to the at least one cross-connecting system; and
the at least one cross-connecting system comprises a storage device containing instructions and at least one processor, the processor configured to execute the instructions to perform a method of:
receiving the traffic from the first routing device, wherein the control portion of the traffic includes a first imported route target,
accessing a table comprising a plurality of instances correlating a plurality of imported route targets including the first imported route target, a plurality of exported route targets, a plurality of destination devices, and a plurality of routing devices including the first routing device,
locating in the table a first instance correlating the first routing device, the first imported route target, and a first exported route target included in the plurality of exported route targets,
based on the first instance, locating in the table a second instance correlating the first imported route target, the first exported route target, and a first destination device included in the plurality of destination devices,
and
based on the second instance, routing the traffic to the first destination device.

10. The system of claim 9, wherein assigning the at least one device to the globally unique address pool comprises:
determining a geographic region associated with the traffic;
determining whether the geographic region is already assigned to an existing address pool;
in response to determining that the geographic region is already assigned to an existing address pool, assigning the at least one device to the existing address pool; and
in response to determining that the geographic region is not already assigned to an existing pool, assigning the at least one device to a new address pool.

11. The system of claim 9, wherein the at least one processor in the filtering device is further configured to execute the instructions to filter the traffic received from the first routing device based on at least an interface associated with the traffic, a data portion of the traffic, the control portion of the traffic, or properties of the traffic.

12. The system of claim 9, wherein routing the traffic to the first destination device comprises reformatting the control portion of the traffic to contain the first exported route target.

13. The system of claim 9, wherein:
the traffic further comprises a source IP address; and
the source IP address is associated with an IP address pool associated with the at least one customer.

14. The system of claim 9, wherein assigning the at least one device to the globally unique address pool comprises:
determining whether the at least one customer is already assigned to an existing address pool;
in response to determining that the at least one customer is already assigned to an existing address pool, assigning the at least one device to the existing address pool; and
in response to determining that the at least one customer is not already assigned to an existing pool, assigning the at least one device to a new address pool.

15. The method of claim 1, further comprising
receiving response traffic from a destination routing device, wherein the response traffic comprises a control portion that includes the first exported route target;
locating in the table the second instance correlating the first imported route target, the first exported route target, and the first destination device;
based on the second instance, locating in the table the first instance correlating the first routing device, the first imported route target, and the first exported route target; and
based on the first instance, routing the response traffic to the first routing device.

16. The system of claim 5, wherein the at least one processor is further operable to execute the instructions to:
receive response traffic from a destination routing device, wherein the response traffic comprises a control portion that includes the first exported route target;
locate in the table the second instance correlating the first imported route target, the first exported route target, and the first destination device;
based on the second instance, locate in the table the first instance correlating the first routing device, the first imported route target, and the first exported route target; and
based on the first instance, route the response traffic to the first routing device.

\* \* \* \* \*